US006292053B1

(12) United States Patent
Ke

(10) Patent No.: US 6,292,053 B1
(45) Date of Patent: Sep. 18, 2001

(54) POWER AMPLIFIER SYSTEM

(75) Inventor: Meng-Kun Ke, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/437,522

(22) Filed: Nov. 10, 1999

(51) Int. Cl.[7] .................................................. H03F 1/14
(52) U.S. Cl. ........................................ 330/51; 330/124 R
(58) Field of Search .................................. 330/51, 124 R

(56) References Cited

U.S. PATENT DOCUMENTS

| 5,287,543 | * | 2/1994 | Wolkstein | 455/13.3 |
| 5,304,943 | * | 4/1994 | Koontz | 330/51 |
| 5,781,066 | * | 7/1998 | Parisi et al. | 330/2 |
| 6,006,111 | * | 12/1999 | Rowland | 455/561 |
| 6,018,644 | * | 1/2000 | Minarik | 455/82 |

* cited by examiner

Primary Examiner—Robert Pascal
Assistant Examiner—Henry Choe
(74) Attorney, Agent, or Firm—Fay, Sharpe, Fagan, Minnich & McKee, LLP

(57) ABSTRACT

An antenna system includes a splitter, which receives a splitter input signal and produces a plurality of splitter output signals. A plurality of amplifiers receive respective ones of the splitter output signals and produce respective amplified outputs. A combiner transforms a plurality of the amplified outputs to an antenna signal. An antenna receives and transmits the antenna signal. A power of the antenna signal is a function of a number of the amplified outputs communicating with the combiner.

17 Claims, 8 Drawing Sheets

| NO. OF AMPS | SECTOR | # AMPS | WATTS | # AMPS | WATTS | # AMPS | WATTS | # AMPS | WATTS | # AMPS | WATTS | # AMPS | WATTS |
|---|---|---|---|---|---|---|---|---|---|---|---|---|---|
| 3 | α | 1 | 20 | 2 | 40 | | | | | | | | |
|   | β | 1 | 20 | 1 | 20 | | | | | | | | |
|   | γ | 1 | 20 | 0 | 0  | | | | | | | | |
| 4 | α | 2 | 40 | 2 | 40 | 3 | 60 | | | | | | |
|   | β | 1 | 20 | 2 | 40 | 1 | 20 | | | | | | |
|   | γ | 1 | 20 | 0 | 0  | 0 | 0  | | | | | | |
| 5 | α | 2 | 40 | 3 | 60 | 3 | 60 | 4 | 80 | | | | |
|   | β | 2 | 40 | 2 | 40 | 1 | 20 | 1 | 20 | | | | |
|   | γ | 1 | 20 | 0 | 0  | 1 | 20 | 0 | 0  | | | | |
| 6 | α | 2 | 40 | 3 | 60 | 3 | 60 | 4 | 80 | 4 | 80 | | |
|   | β | 2 | 40 | 2 | 40 | 3 | 60 | 1 | 20 | 2 | 40 | | |
|   | γ | 2 | 40 | 1 | 20 | 0 | 0  | 1 | 20 | 0 | 0  | | |
| 7 | α | 3 | 60 | 3 | 60 | 4 | 80 | 4 | 80 | 5 | 100 | 5 | 100 |
|   | β | 2 | 40 | 3 | 60 | 2 | 40 | 3 | 60 | 1 | 20  | 2 | 40  |
|   | γ | 2 | 40 | 1 | 20 | 1 | 20 | 0 | 0  | 1 | 20  | 0 | 0   |
| 8 | α | 3 | 60 | 4 | 80 | 4 | 80 | 4 | 80 | 5 | 100 | 5 | 100 |
|   | β | 3 | 60 | 2 | 40 | 3 | 60 | 4 | 80 | 2 | 40  | 3 | 60  |
|   | γ | 2 | 40 | 2 | 40 | 1 | 20 | 0 | 0  | 1 | 20  | 0 | 0   |
| 9 | α | 3 | 60 | 4 | 80 | 4 | 80 | 5 | 100 | 5 | 100 | 5 | 100 |
|   | β | 3 | 60 | 3 | 60 | 4 | 80 | 4 | 80  | 3 | 60  | 2 | 40  |
|   | γ | 3 | 60 | 2 | 40 | 1 | 20 | 0 | 0   | 1 | 20  | 2 | 40  |
| 10 | α | 4 | 80 | 4 | 80 | 5 | 100 | 5 | 100 | 5 | 100 | | |
|    | β | 3 | 60 | 4 | 80 | 3 | 60  | 4 | 80  | 5 | 100 | | |
|    | γ | 3 | 60 | 2 | 40 | 2 | 40  | 1 | 20  | 0 | 0   | | |
| 11 | α | 4 | 80 | 5 | 100 | 5 | 100 | 5 | 100 | | | | |
|    | β | 4 | 80 | 3 | 60  | 4 | 80  | 5 | 100 | | | | |
|    | γ | 3 | 60 | 3 | 60  | 2 | 40  | 1 | 20  | | | | |
| 12 | α | 4 | 80 | 5 | 100 | 5 | 100 | | | | | | |
|    | β | 4 | 80 | 4 | 80  | 5 | 100 | | | | | | |
|    | γ | 4 | 80 | 3 | 60  | 2 | 40  | | | | | | |
| 13 | α | 4 | 80 | 5 | 100 | | | | | | | | |
|    | β | 4 | 80 | 4 | 80  | | | | | | | | |
|    | γ | 4 | 80 | 3 | 60  | | | | | | | | |
| 14 | α | 5 | 100 | | | | | | | | | | |
|    | β | 5 | 100 | | | | | | | | | | |
|    | γ | 4 | 80  | | | | | | | | | | |
| 15 | α | 5 | 100 | | | | | | | | | | |
|    | β | 5 | 100 | | | | | | | | | | |
|    | γ | 5 | 100 | | | | | | | | | | |

POWER AMPLIFIER SYSTEM

BACKGROUND OF THE INVENTION

The present invention relates to power amplifier systems. It finds particular application in conjunction with dynamic power amplifier systems, and will be described with particular reference thereto. It will be appreciated, however, that the invention is also amenable to other like applications.

When radio power is to be radiated (or received) by electronically scanning one (1) or more beams over a wide angular range with optimum efficiency, it is possible to use either passive or active antennas. Passive antennas include a main amplifier followed by a fixed or variable power divider together with phase shifters and/or switches. Active antennas incorporate radio-frequency amplifiers.

In conventional systems, antennas are positioned to radiate in corresponding directions. For example, three (3) antennas may be positioned to broadcast in three (3) respective sectors of a 360 degree angular range (i.e., each sector includes 120 degrees). Respective sets of amplifiers are electrically connected to the antennas in each of the sectors. Each set of amplifiers increases the power of the respective source signals before the signals are transmitted from the antennas. The maximum amount of power incorporated into any one of the source signals is a function of the number of amplifiers in each of the respective sets.

As discussed above, each of the amplifiers in conventional systems only communicates with a specific antenna and cannot be selectively switched to another one of the antennas in the system. Therefore, the power provided by the amplifiers cannot be selectively allocated among the antennas.

Assuming each antenna in the system only communicates with one set of amplifiers, the power output from any one antenna is a function of the number of amplifiers in the set. In other words, it is not possible for an antenna to communicate with an amplifier in another set of amplifiers. Therefore, if one of the amplifiers fails, the power output of the antenna connected to the failed amplifier decreases accordingly.

One method of compensating for failed amplifier(s) is redundancy. Redundancy involves incorporating additional amplifier(s) into each set of amplifiers communicating with an antenna. The additional amplifier(s) are not used unless one (1) or more of the amplifiers within the set fails. More specifically, the additional amplifiers are kept in an "off" state unless one (1) or more of the primary amplifiers fails. In this sense, the additional amplifier(s) act as backups to the primary amplifiers. Therefore, if one (1) of the primary amplifiers within a set fails, the additional amplifier(s) are switched on in order to compensate for the failure.

While redundancy provides backup amplifiers in the event that one (1) or more amplifier fails, conventional implementations of redundancy also increase the total cost and weight of the antenna system. More specifically, redundancy typically increases the total number of amplifiers in the antenna system. The increased cost and weight are undesirable. A need exists to provide redundancy without increasing the total number of amplifiers in an antenna system.

The present invention provides a new and improved apparatus and method which overcomes the above-referenced problems and others.

SUMMARY OF THE INVENTION

A power amplifier system includes a transmitting device and a plurality of amplifiers producing respective amplified outputs. First switching circuitry selectively switches a plurality of input signals to respective inputs of the amplifiers. Second switching circuitry selectively switches the respective amplified outputs to create a transmitting signal which is received and transmitted by the transmitting device. A power of the transmitting signal is a function of a number of the amplified outputs communicating with the transmitting device.

One advantage of the present invention is that redundant amplifiers are provided in an efficient manner.

Another advantage of the present invention is that respective powers of antennas in the system can be selectively set by a user.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 7 illustrates a chart showing respective power outputs of antennas in systems having various numbers of amplifiers.

DETAILED DESCRIPTION OF THE PREFERRED EMBODIMENTS

Figure 1A:
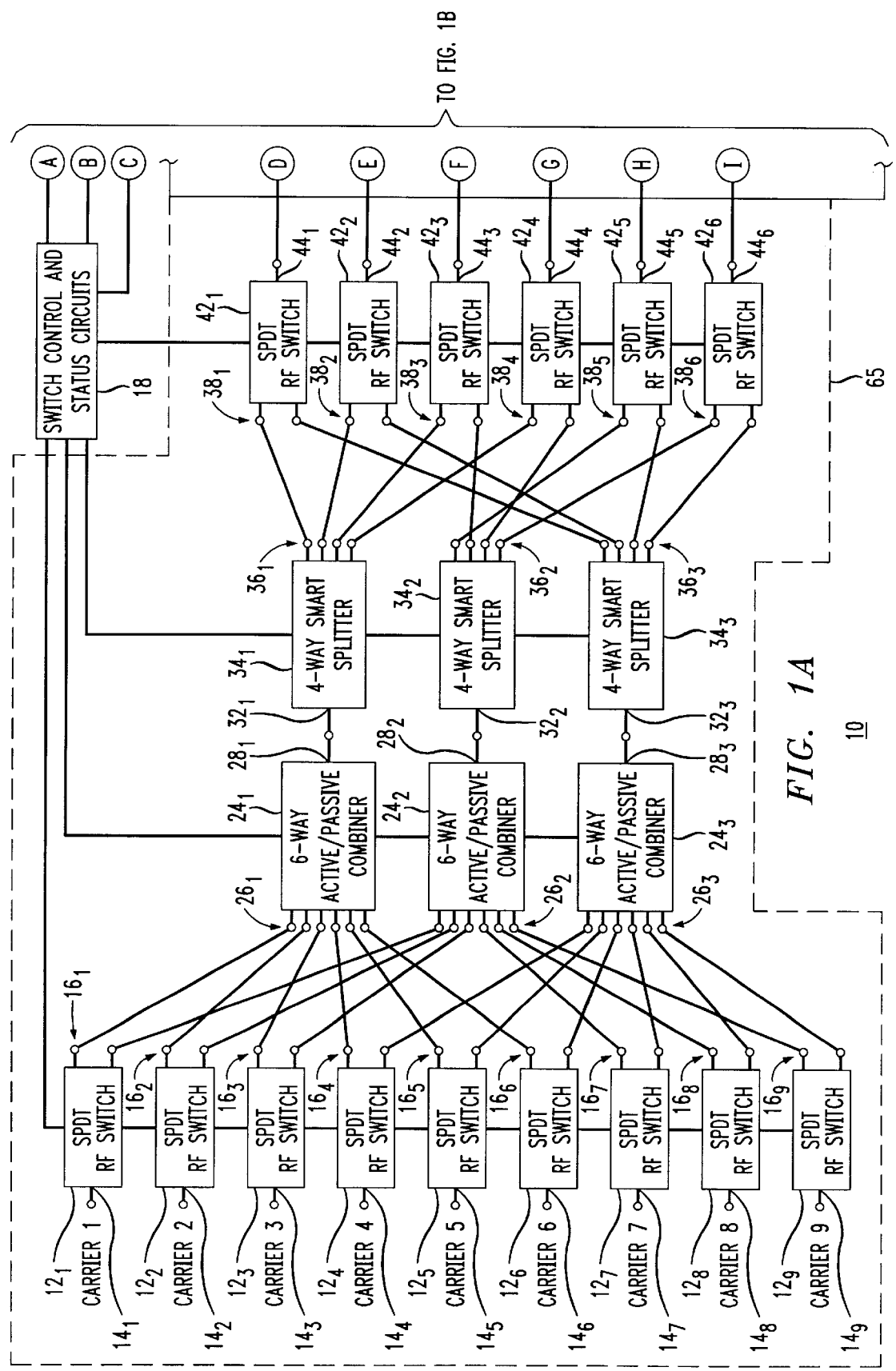
FIGS. 1A and 1B illustrate an antenna system according to the present invention.
Figure 1B:
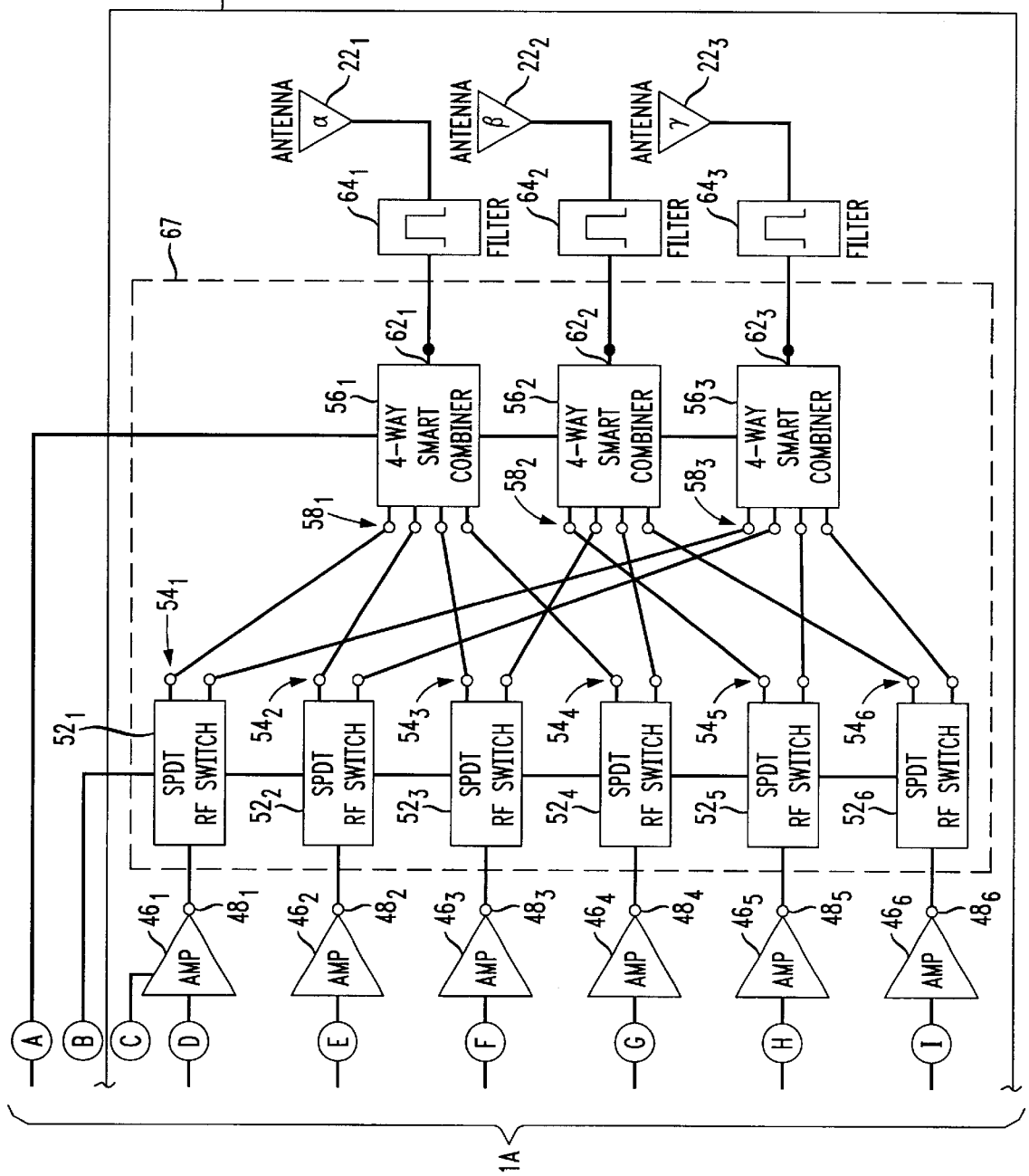

With reference to FIGS. 1A and 1B, an antenna system 10 includes nine (9) carrier switches 12. Preferably, the carrier switches 12 are single-pole, double-throw radio-frequency switches. However, other switches, capable of transmitting microwave or higher frequency signals, are also contemplated. Each of the carrier switches 12 includes a respective carrier input 14 and a set of two (2) carrier outputs 16. Each carrier input 14 receives up to two (2) input channel (i.e., frequency) signals. In the preferred embodiment, the input signals are radio-frequency ("RF") signals. However, it is to be understood that microwave or higher frequency signals are also contemplated. The carrier switches 12 switch the RF signals received at the respective carrier inputs 14 to one (1) of the two (2) carrier outputs 16.

A control circuit 18 electrically controls the carrier switches 12 by switching the respective input 14 to one (1) of the respective carrier outputs 16. As will be discussed in more detail below, the settings of the carrier switches 12 are one of several factors in determining the powers of respective signals transmitted from three (3) respective antennas 22 in the system 10. It is to be understood that the control circuit 18 is capable of being set by a user to selectively achieve the respective powers of the signals transmitted from the antennas 22. In the preferred embodiment, each of the antennas 22 transmits a signal in one (1) of three (3) sectors of a 360 degree range (e.g., each antenna transmits a signal in a range covering 120 degrees). Therefore, it is possible to selectively control the powers of the signals transmitted in the respective sectors via the control circuit 18. In this manner, the system 10 is considered to be a dynamic amplifier system.

Three (3) active/passive combiners 24 communicate with the carrier switches 12. Each of the active/passive combiners 24 includes six (6) inputs 26 and one (1) output 28, respectively. Each of the two (2) carrier outputs 16 for each of the respective carrier switches 12 communicates with a different one (1) of the active/passive combiners 24. More specifically, as illustrated in FIG. 1A, one (1) of the carrier outputs $16_1$ of the carrier switch $12_1$ communicates with the active/passive combiner $24_1$ while the other carrier output $16_1$ communicates with the active/passive combiner $24_2$. The remaining connections between the carrier switches 12 and the active/passive combiners 24 are illustrated in FIG. 1A.

In the preferred embodiment shown in FIG. 1A, each of the active/passive combiners 24 receives six (6) RF signals from the various carrier switch outputs 16. The active/passive combiners 24 combine the six (6) respective RF signals to form respective active/passive combiner output signals at the respective active/passive combiner outputs 28. The signals are combined in the active/passive combiners 24 according to control signals received from the control circuit 18. More specifically, the control circuit 18 may cause, for example, only three (3) of the six (6) input signals in one (1) of the active/passive combiners 24 to be combined to form the respective active/passive combiner output signal.

The active/passive combiner outputs 28 act as splitter input signals to respective inputs 32 of three (3) splitters 34. In addition to the inputs 32, each of the splitters 34 includes a respective set of four (4) outputs 36. Although each splitter preferably includes a set of four (4) outputs, other embodiments, in which the splitters include more or less outputs, are also contemplated.

The splitters 34 divide (i.e., split) the respective input signals into a desired number of splitter output signals at the respective splitter outputs 36. More specifically, the power of the splitter input signal is divided among the four (4) outputs 36 in each of the respective splitters 34. Furthermore, the control circuit 18, which determines respective loads on each of the splitter outputs 36, causes respective impedances of the splitter output signals to substantially match the load determined for the respective splitter output 36. In this manner, the powers of the splitter output signals are transferred in an efficient manner. For this reason, the splitters 34 are referred to as "smart" splitters. Although the respective splitter input signals are divided among the four (4) outputs 36 in the preferred embodiment, it is to be understood that other embodiments, in which the splitter input signals are divided to fewer than the maximum number of splitter outputs, are also contemplated.

Each of the four (4) outputs 36 of the respective splitters 34 communicates with one (1) of a plurality of inputs 38 of respective input switches 42. Furthermore, not more than one (1) of the splitter outputs 36 from a respective splitter 34 communicates with the same input switch 42. In the preferred embodiment, the system 10 includes six (6) input switches 42. Each of the input switches 42 includes two (2) inputs 38 and one (1) output 44. Also, each of the input switches is a single-pole, double-through switch that transmits radio-frequency signals. However, other embodiments, in which the input switches include other numbers of inputs and/or transmit microwave or higher frequency signals are also contemplated.

The control circuit 18 controls the input switches 42 to transmit the respective input signals to respective amplifiers 46. More specifically, in the embodiment shown in FIG. 1A, one of each of the splitter outputs $36_1$, $36_3$ communicates with one of the input switch inputs $38_1$. Depending on the desired output powers of the antennas 22, the control circuit 18 causes one of the inputs 38 for each of the input switches 42 to communicate with the respective amplifier 46 via the respective input switch output 44. For example, the control circuit 18 causes one of the inputs $38_1$ to communicate with the amplifier $46_1$ via the input switch output $44_1$.

The control circuit 18 independently controls the power to each of the amplifiers 46. In this manner, if no signals are transmitted to the input switch $42_1$ and, consequently, no signal is transferred to the amplifier $46_1$ the control circuit 18 may cause the power to the amplifier $46_1$ to be shut off. Power to the other amplifiers 46 is controlled in a similar manner. Therefore, if certain amplifiers 46 are not necessary to achieve the desired powers of the respective output signals transmitted from the antennas 22, those amplifiers 46 are preferably shut off.

During use, amplifiers consume DC power. Turning-off unused amplifiers increases both the DC and RF efficiencies of the system 10. Furthermore, the fact that the power to the amplifiers may be selectively controlled allows for efficient redundancy in the system 10. More specifically, because amplifiers are selectively switched to any antenna in the system, additional amplifiers are not necessary for each antenna. Therefore, if one amplifier fails, any other amplifier in the system may be used to boost the power of the signal output from any of the antennas.

A respective output 48 of each amplifier 46 communicates with a plurality of output switches 52. Each output switch 52 includes a plurality of outputs 54. In the preferred embodiment, each of the output switches 52 is a single-pole, double-through switch, which transmits radio-frequency signals, and includes a single input and two (2) outputs 54. However, other embodiments, in which the output switches transmit microwave or higher frequency signals and/or include other numbers of outputs are also contemplated. The control circuit 18 causes each of the output switches 52 to transmit the signal from the respective input to one (1) of the respective outputs 54.

Each of the outputs 54 for each respective output switch 52 communicates with a different one of a plurality of combiners 56. In the preferred embodiment, three (3) combiners 56, each having four (4) inputs 58, communicate with the output switch outputs 54. Preferably, each of the outputs 54 for each respective output switch 52 communicates with a different combiner 56. For example, one (1) of the outputs $54_1$ for the output switch $52_1$ communicates with the combiner $56_1$ while the other of the outputs $54_1$ communicates with the combiner $56_3$.

The combiners 56 aggregate the signals received at the respective combiner inputs 58 and create respective antenna signals at combiner outputs 62. The antenna signals are preferably passed through respective filters 64 before being transmitted from antennas 22. The control circuit 18 causes the combiners 56 to aggregate the signals received at the combiner inputs 58 to have respective impedances that substantially match the antennas 22. Therefore, the power of the signals is transmitted to the antennas 22 with maximum efficiency.

As has been described above, the power of the antenna signals is managed by the control circuit 18. Preferably, a user sets the control circuit 18 to achieve a desired power output for each of the antenna signals. Then, the control circuit 18 activates the various connections and switches to direct certain input frequency signals from the carrier inputs 14, through the various combiners 24, 56, splitters 34, amplifiers 46, switches 42, 52, and amplifiers 46 to achieve the desired result.

The control circuit 18, which determines respective loads on each of the combiner outputs 62, causes respective impedances of the combiner output signals to substantially match the load determined for the respective antennas 22. In this manner, the powers of the combiner output signals are transferred in an efficient manner. For this reason, the combiners 56 are referred to as "smart" combiners.

In the embodiment shown in FIGS. 1A and 1B, nine (9) RF carriers are combined, split, and ultimately fed into the three (3) antennas 22. Each antenna 22 is capable of transmitting the combined signal of six (6) carriers. Because the smart combiners 56 include four (4) inputs 58, each antenna 22 supports up to four (4) power amplifiers 46. It is to be understood that the carrier switches 12, the combiners 24, the splitters 34, and the input switches 42 comprise first switching circuitry 65 within the antenna system 10. Furthermore, the output switches 52, and the combiners 56 comprise second switching circuitry 67 within the antenna system 10.

Figure 2:
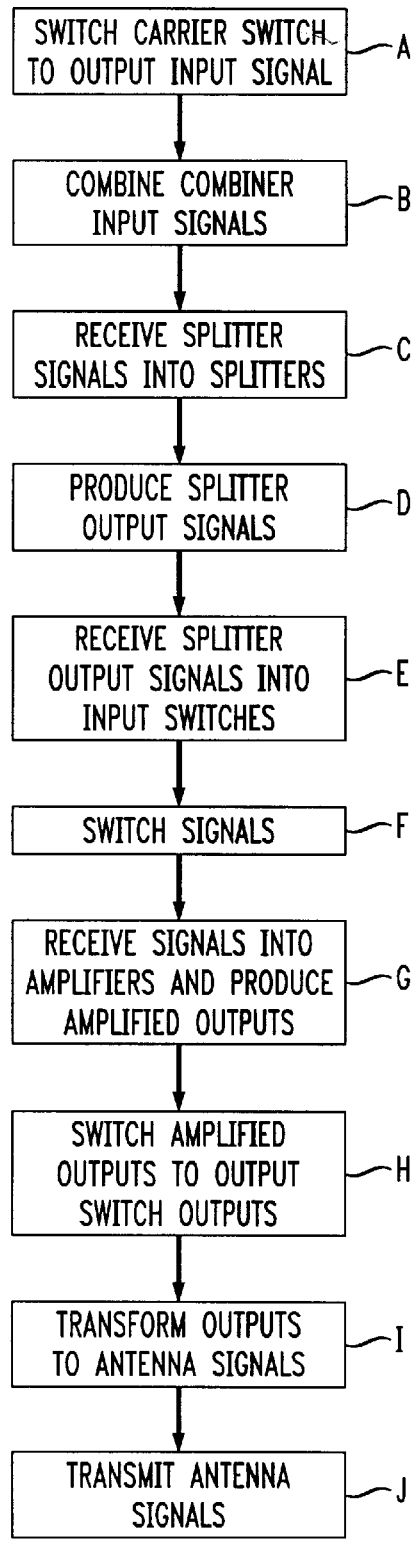
FIG. 2 illustrates a flow-chart according to the system of the present invention.

With reference to FIGS. 1A, 1B, and 2, the carrier switches 12 are switched, in a step A, to output a respective carrier input signal to one of the active/passive combiners 24. The respective combiner input signals are combined, via the active/passive combiners 24, in a step B to form the respective splitter input signals. The respective splitter input signals are received into the splitters 34 in a step C. The splitter output signals are produced from the splitters 34 in a step D. Sets of the splitter output signals are received into the respective input switches 42 in a step E. The signals are switched to respective input switch outputs in a step F.

The signals are received into the amplifiers 46 and the respective amplified outputs are produced in step G. The amplified outputs are switched to one of the respective output switch outputs in a step H. The output switch outputs are transformed, via at least two combiners, to respective the antenna signals in a step I. The respective antenna signals are received into the antennas 22 in a step J. The antenna signals are transmitted from the respective antennas 22 in a step K.

FIGS. 3–6 illustrate other embodiments of the present invention including various numbers of amplifiers and RF switches communicating with combiners, which include five (5) inputs and a single output. The embodiments shown in FIGS. 3–6 illustrate the concept that circuits such as those shown in FIGS. 1A and 1B can be easily expanded or contracted to include more/less amplifiers. It is to be understood that the circuits shown in FIGS. 3–6 are partial circuits corresponding to respective portions 100 of the circuit 10 shown in FIGS. 1A and 1B. The respective numbers of components (e.g., input switches 42) used for producing inputs to the circuits shown in FIGS. 3–6 vary according to the respective number of amplifiers. Furthermore, it is to be understood that although respective control circuits are not illustrated in FIGS. 3–6, such circuits, like the control circuit 18 illustrated in FIGS. 1A and 1B, are utilized to manage the respective circuits' operations in FIGS. 3–6.

Figure 3:
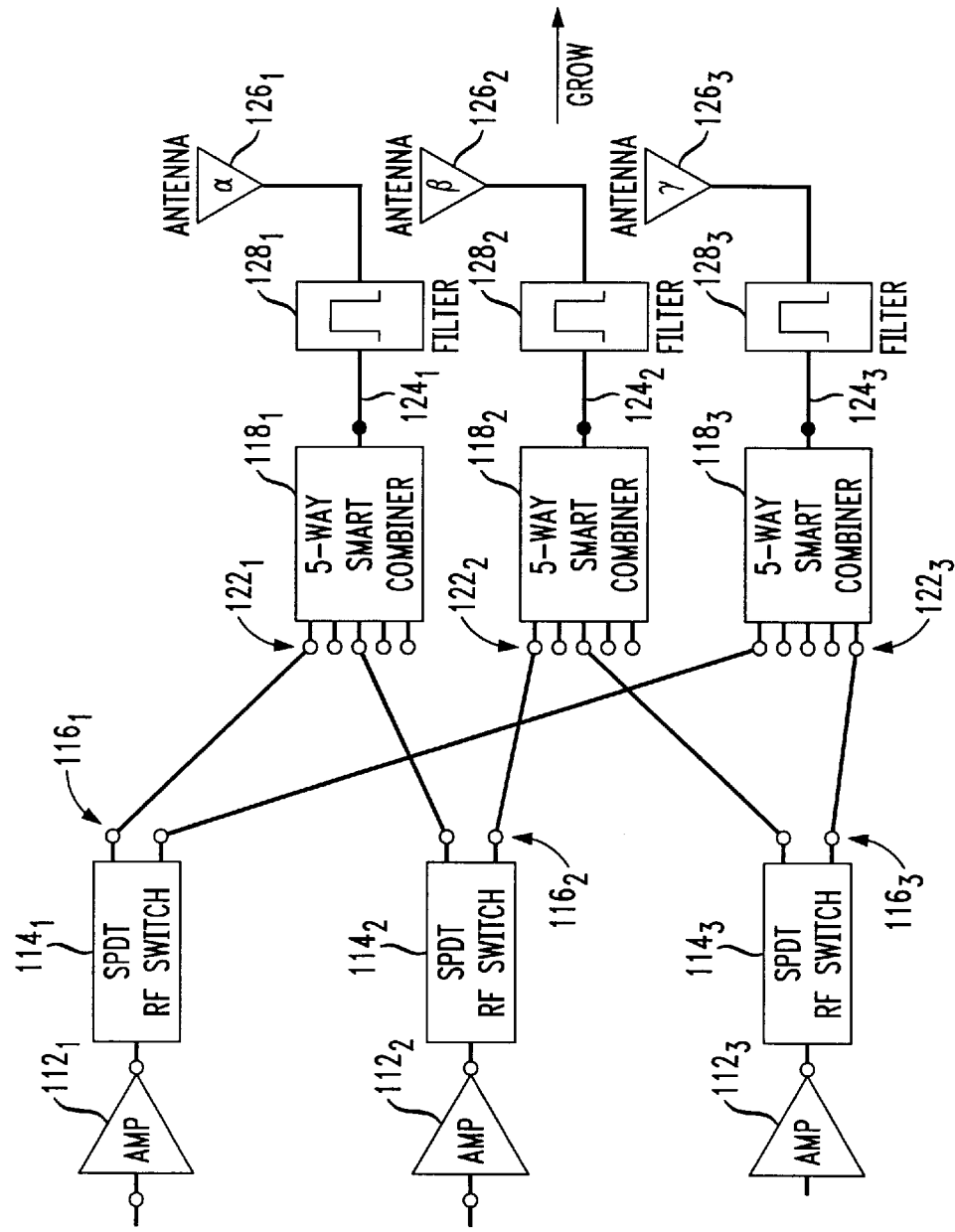
FIGS. 3–6 illustrate respective antenna systems according to alternate embodiments of the present invention.

FIG. 3 shows a circuit 110 including three (3) amplifiers 112. Three (3) output switches 114 are electrically connected to the respective amplifiers 112. Each of the output switches 114 includes a single input and two (2) outputs 116. Each of the outputs 116 for each respective output switch 114 is connected to a different one (1) of three (3) 5-way combiners 118. Each of the 5-way combiners 118 includes five (5) inputs 122 and a single output 124. The outputs 124 are connected to respective antennas 126 via filters 128. As in the embodiment shown in FIGS. 1A and 1B, the combiners 118 combine input signals to produce an output signal having an impedance substantially matched to a load on the respective output 124.

Because there are three (3) output switches 114, each having two (2) outputs 116, each of the combiners 118 utilizes two (2) of the five (5) respective inputs 122. Therefore, if each amplifier 112 outputs 20 watts, each of the antennas 126 outputs a signal in a range including zero (0) and 40 watts. However, it is to be understood that the total power output from all three (3) antennas does not exceed 60 watts (i.e., three (3) amplifiers each producing 20 watts).

Figure 4:
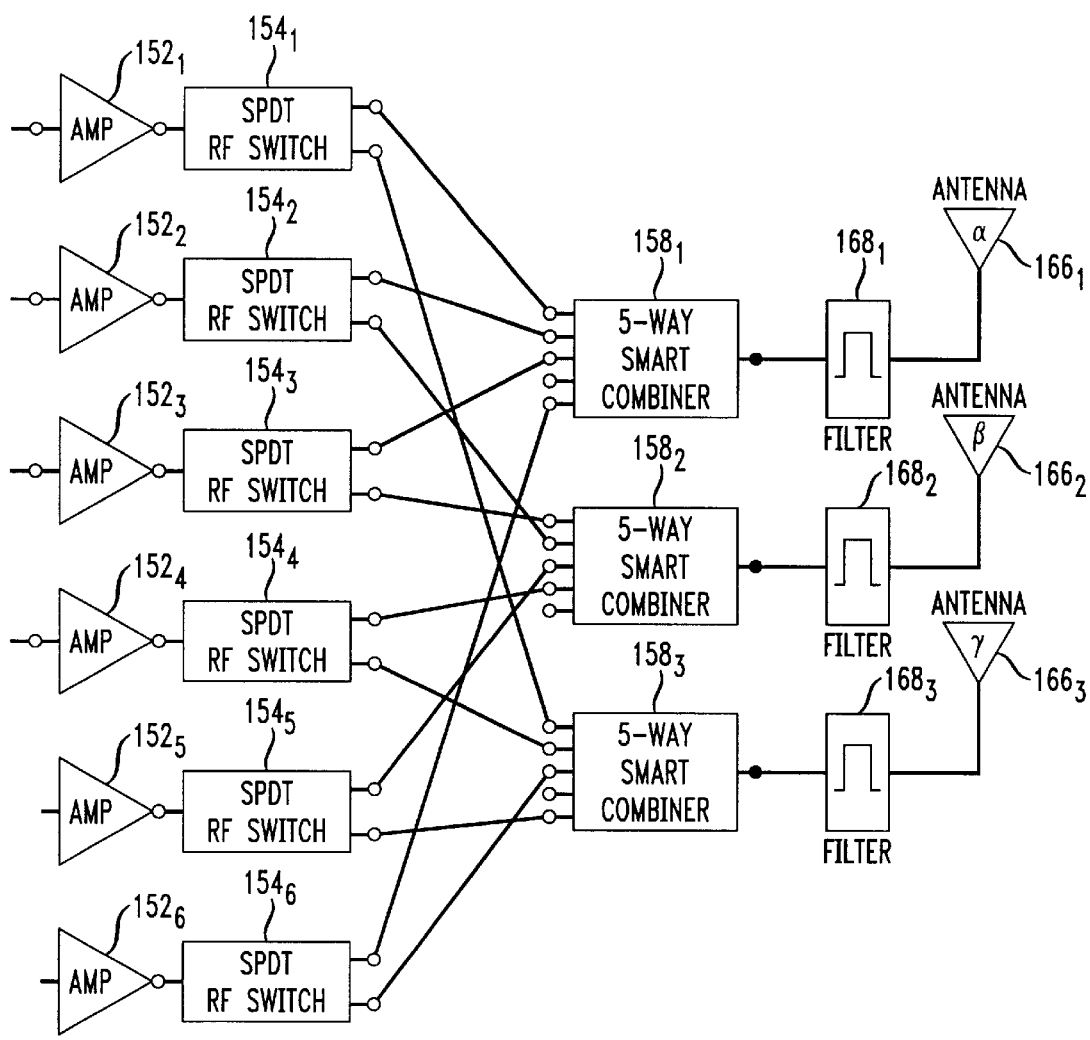

FIG. 4 shows a circuit 150 including six (6) amplifiers 152. Six (6) output switches 154 are electrically connected to the respective amplifiers 152. Each of the output switches 154 includes a single input and two (2) outputs 156. Each of the outputs 156 for each respective output switch 154 is connected to a different one (1) of three (3) 5-way combiners 158. Each of the 5-way combiners 158 includes five (5) inputs 162 and a single output 164.

Because there are six (6) output switches 154, each having two (2) outputs 156, each of the combiners 158 utilizes four (4) of the five (5) respective inputs 162. Therefore, if each amplifier 152 outputs 20 watts, each of the antennas 166 outputs a signal in a range including zero (0) and 80 watts. However, it is to be understood that the total power output from all three (3) antennas does not exceed 120 watts (i.e., six (6) amplifiers each producing 20 watts).

Figure 5:
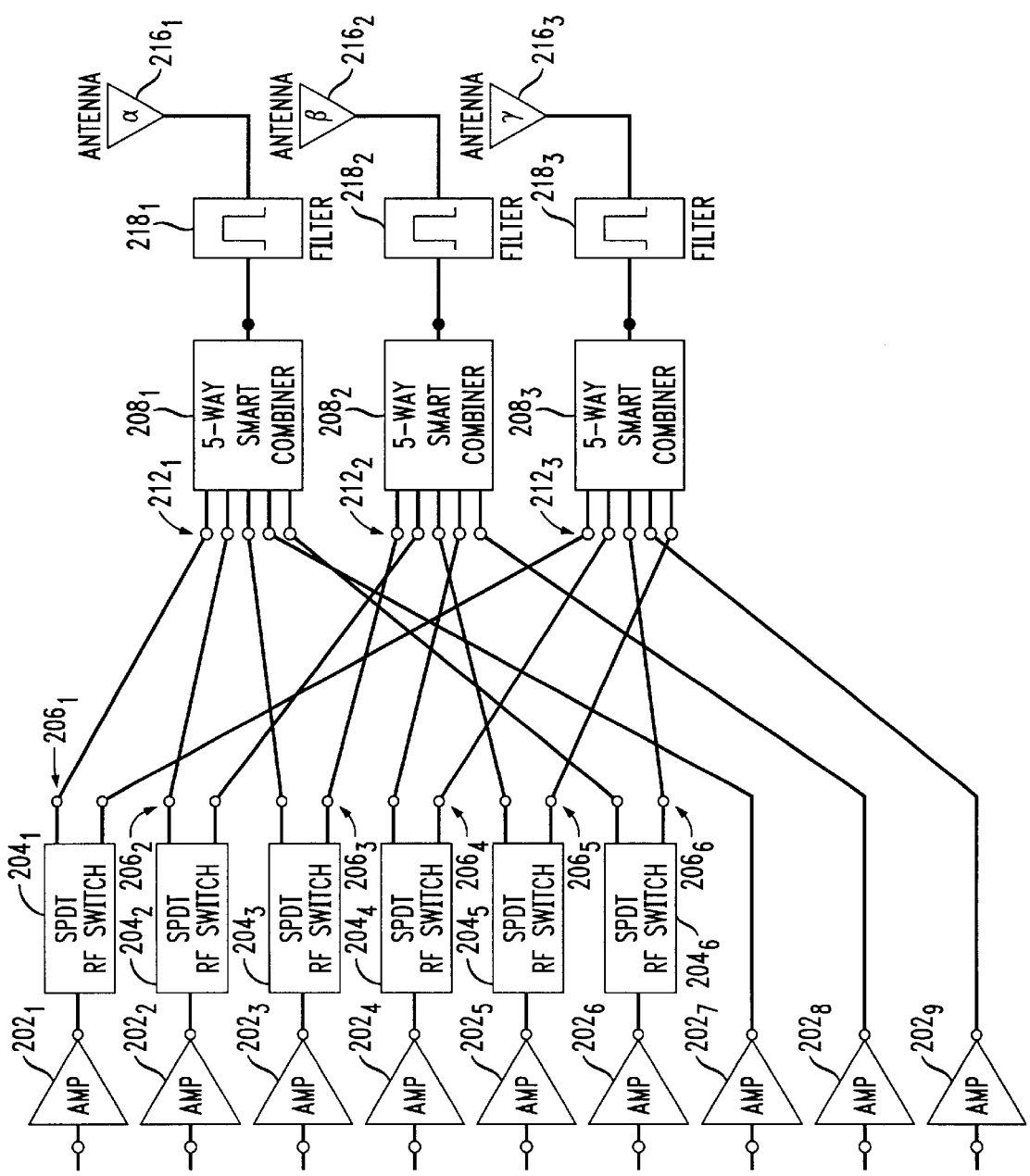

FIG. 5 shows a circuit 200 including nine (9) amplifiers 202. Six (6) output switches 204 are electrically connected to the respective amplifiers 202. Each of the output switches 204 includes a single input and two (2) outputs 206. Each of the outputs 206 for each respective output switch 204 is connected to a different one (1) of three (3) 5-way combiners 208. Each of the 5-way combiners 208 includes five (5) inputs 212 and a single output 214. Three (3) of the amplifiers are connected directly to the respective combiners 208. In this manner, each of the five (5) inputs 212 for each of the combiners 208 is used. The outputs 214 are connected to respective antennas 216 via filters 218. As in the embodiment shown in FIGS. 1A and 1B, the combiners 208 combine input signals to produce an output signal having an impedance substantially matched to a load on the respective output 214.

As discussed above, all five (5) of the respective inputs 212 are utilized for each of the combiners 208. Therefore, if each amplifier 202 outputs 20 watts, each of the antennas 216 outputs a signal in a range including zero (0) and 100 watts. However, it is to be understood that the total power output from all three (3) antennas does not exceed 180 watts (i.e., nine (9) amplifiers each producing 20 watts).

Figure 6:
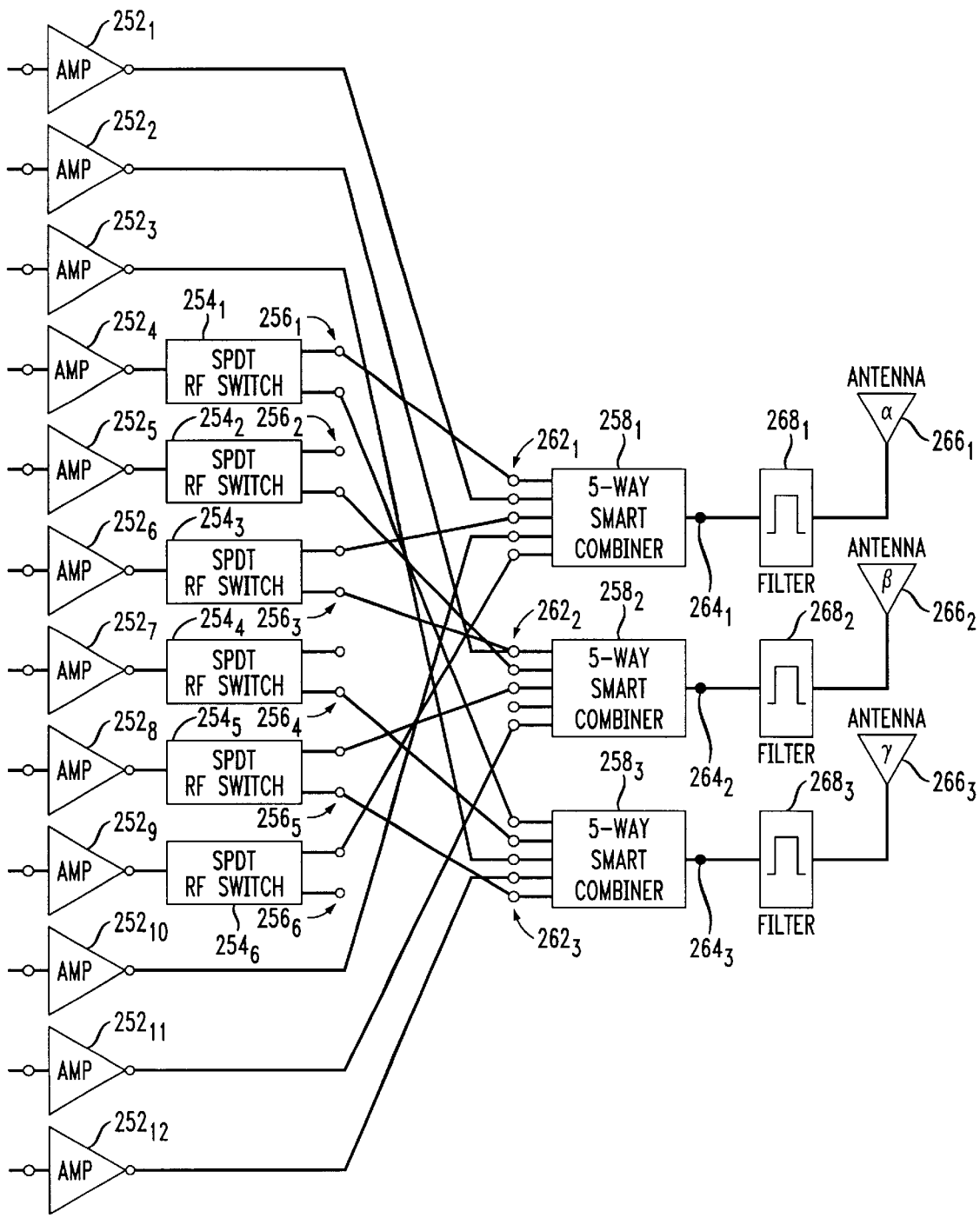

FIG. 6 shows a circuit 250 including twelve (12) amplifiers 252. Six (6) output switches 254 are electrically connected to the respective amplifiers 252. Each of the output switches 254 includes a single input and two (2) outputs 256. Each of the outputs 256 for each respective output switch 254 is connected to a different one (1) of three (3) 5-way combiners 258. Each of the 5-way combiners 258 includes five (5) inputs 262 and a single output 264. Three (3) of the amplifiers are connected directly to the respective combiners 258. In this manner, each of the five (5) inputs 262 for each of the combiners 258 is used. The outputs 264 are connected to respective antennas 266 via filters 268. As in the embodiment shown in FIGS. 1A and 1B, the combiners 258 combine input signals to produce an output signal having an impedance substantially matched to a load on the respective output 264.

As discussed above, all five (5) of the respective inputs 262 are utilized for each of the combiners 258. Therefore, if each amplifier 252 outputs 20 watts, each of the antennas 266 outputs a signal in a range including zero (0) and 100 watts. However, it is to be understood that the total power output from all three (3) antennas does not exceed 240 watts (i.e., twelve (12) amplifiers each producing 20 watts).

FIG. 7 illustrates possible power outputs from respective antennas in three (3) sectors ($\alpha$, $\beta$, $\gamma$) when, as in FIGS. 3–6, a 5-way smart combiner is used. The maximum output power per amplifier is assumed to be 20 watts. As shown in FIG. 7, a system including three (3) amplifiers has two (2) possible output schemes. More specifically, in the first scheme, each of the three (3) antennas communicates with one (1) amplifier and, therefore, outputs 20 watts. In the second scheme, the antenna transmitting in the $\alpha$ sector, for example, communicates with two (2) amplifiers and, therefore, outputs 40 watts; the antenna transmitting in the $\beta$ sector, for example, communicates with one (1) amplifier and, therefore, outputs 20 watts; the antenna transmitting in the $\gamma$ sector, for example, communicates with zero (0) amplifiers and, therefore, outputs zero (0) watts. The various schemes for systems including other number of amplifiers are shown in FIG. 7.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A power amplifier system, comprising:
   a transmitting device including an antenna;
   a plurality of amplifiers producing respective amplified outputs;
   a first switching circuitry for selectively switching a plurality of input signals to respective inputs of the amplifiers, the first switching circuitry including a splitter receiving a splitter input signal and producing a plurality of splitter output signals; and
   a second switching circuitry for selectively switching the respective amplified outputs to create a transmitting signal which is received and transmitted by the transmitting device, the second switching circuitry including an output switch for selectively switching the amplified outputs to a combiner, which transforms a plurality of the amplified outputs to the transmitting signal, the antenna receiving and transmitting the transmitting signal, a power of the transmitting signal being a function of a number of the amplified outputs communicating with the combiner and the transmitting device.

2. The power amplifier system as set forth in claim 1, wherein the first switching circuitry includes an input switch for selectively switching the splitter output signals to the amplifiers.

3. The power amplifier system as set forth in claim 2, wherein each of the splitter output signals is adapted to communicate with a different one of the amplifiers.

4. The power amplifier system as set forth in claim 3, wherein the splitter produces four splitter output signals.

5. The power amplifier system as set forth in claim 4, wherein the combiner is adapted for transforming at least four amplified outputs to the transmitting signal.

6. The power amplifier system as set forth in claim 1 wherein:
   the first switching circuitry further includes:
      at least one additional splitter receiving respective additional splitter input signals and producing a respective pluralities of additional splitter output signals;
      a plurality of input switches each having a plurality of inputs and an output, each of the inputs for each of the respective input switches being capable of receiving one of the splitter output signals from a different one of the splitters, each of the outputs being capable of transmitting one of the splitter output signals to a different one of the amplifiers;
   the second switching circuitry further includes:
      at least one additional combiner transforming respective pluralities of the amplified outputs to respective additional transmitting signals;
      a plurality of output switches each having an input and a plurality of outputs, the respective inputs being capable of receiving a different one of the amplified outputs and the outputs being capable of transmitting the respective amplified output to a different one of the combiners; and
   the transmitting device includes at least one additional antenna receiving and transmitting the respective additional transmitting signals, respective powers of the additional transmitting signals being a function of a number of the amplified outputs communicating with the respective combiner.

7. The power amplifier system as set forth in claim 6, wherein the first switching circuitry further includes:
   a plurality of active/passive combiners for combining a plurality of respective combiner input signals to form the respective splitter input signals; and
   a plurality of carrier switches each having an input receiving a carrier input signal and a plurality of outputs, each of the outputs of each of the respective carrier switches communicating with a different one of the active/passive combiners.

8. A power amplifier system, comprising:
   a transmitting device;
   a plurality of amplifiers producing respective amplified outputs;
   a first switching circuitry for selectively switching a plurality of input signals to respective inputs of the amplifiers;
   a second switching circuitry for selectively switching the respective amplified outputs to create a transmitting signal which is received and transmitted by the transmitting device, a power of the transmitting signal being a function of a number of the amplified outputs communicating with the transmitting device; and
   a control circuit for dynamically and selectively controlling the amplifiers, the first switching circuitry, and the second switching circuitry.

9. The power amplifier system as set forth in claim 8, wherein the control circuit regulates a power to the respective amplifiers.

10. A method for transmitting signals, the method comprising:
   selectively switching a plurality of input signals to respective inputs of a plurality of amplifiers, the step of switching the input signals including:
      receiving a splitter input signal into a splitter;

producing a plurality of splitter output signals from the splitter; and receiving respective ones of the splitter output signals into the amplifiers;

selectively switching respective amplified outputs of the amplifiers to create a transmitting signal which is received and transmitted by a transmitting device, the step of switching the amplified outputs including:

transforming, via a combiner, the amplified outputs to the transmitting signal, a power of the transmitting signal being a function of a number of the amplified outputs communicating with the transmitting device and the combiner; and transmitting the transmitting signal from the transmitting device.

11. The method for transmitting signals as set forth in claim 10, wherein the step of receiving the splitter output signals into the amplifiers includes:

receiving each of the respective splitter output signals into a different one of the amplifiers.

12. The method for transmitting signals as set forth in claim 11, wherein the step of transforming includes:

transforming at least four of the amplified outputs to the transmitting signal.

13. A method for transmitting signals, comprising:

selectively switching a plurality of input signals to respective inputs of a plurality of amplifiers, including:
receiving a splitter input signal into a splitter;
producing a plurality of splitter output signals from the splitter;
receiving respective ones of the splitter output signals into the amplifiers;
receiving at least one additional splitter input signal into at least one respective additional splitter; and
producing respective pluralities of additional splitter output signals from the at least one additional splitter;

selectively switching respective amplified outputs of the amplifiers to create a transmitting signal which is received and transmitted by a transmitting device, a power of the transmitting signal being a function of a number of the amplified outputs communicating with the transmitting device, including:
transforming, via a combiner, the amplified outputs to the transmitting signal, a power of the transmitting signal being a function of a number of the amplified outputs communicating with the combiner;
transforming, via the combiner and at least one additional combiner, a plurality of the amplified outputs to respective transmitting signals; and
receiving the transmitting signals into the transmitting device and at least one additional transmitting device, respective powers of the transmitting signals being a function of a number of the amplified outputs communicating with the respective combiner; and transmitting the transmitting signal from the transmitting device.

14. The method for transmitting signals as set forth in claim 13, further including:

passing the splitter outputs through a plurality of input switches, each of the input switches having an output communicating with a respective one of the amplifiers;

switching the input switches to output a respective one of the splitter output signals;

outputting the amplified outputs to the combiners via a plurality of output switches, each of the output switches having an input communicating with a respective one of the amplifiers and a plurality of outputs capable of communicating with a different one of the combiners; and switching the output switches to output the respective amplified outputs to one of the combiners.

15. The method for transmitting signals as set forth in claim 13, further including:

combining a plurality of respective combiner input signals, via a plurality of active/passive combiners, to form the respective splitter input signals; and switching a plurality of radio-frequency carrier switches to output the combiner input signals to the respective active/passive combiners.

16. A antenna system, comprising:

a splitter receiving a splitter input signal and producing a plurality of splitter output signals;

a plurality of amplifiers receiving respective ones of the splitter output signals and producing respective amplified outputs;

a combiner transforming a plurality of the amplified outputs to an antenna signal;

an antenna receiving and transmitting the antenna signal, a power of the antenna signal being a function of a number of the amplified outputs communicating with the combiner;

at least one additional splitter receiving respective additional splitter input signals and producing a respective pluralities of additional splitter output signals;

a plurality of input switches each having a plurality of inputs and an output, the inputs being capable of communicating with the splitter output signals, each of the outputs being capable of transmitting one of the splitter output signals to a different one of the amplifiers;

at least one additional combiner transforming respective pluralities of the amplified outputs to respective additional antenna signals; and a plurality of output switches each having an input and a plurality of outputs, the respective inputs being capable of receiving a different one of the amplified outputs and the outputs being capable of transmitting the respective amplified output to a different one of the combiners.

17. The antenna system as set forth in claim 16, further including:

a control circuit electrically connected to the splitters, the amplifiers, the combiners, the input switches, and the output switches for controlling the number of the amplified outputs communicating with the combiner.

* * * * *